UNITED STATES PATENT OFFICE.

ALEXANDER CLASSEN, OF AIX-LA-CHAPELLE, GERMANY.

FORMALDEHYDE STARCH AND METHOD OF MAKING SAME.

SPECIFICATION forming part of Letters Patent No. 602,697, dated April 19, 1898.

Application filed August 20, 1896. Serial No. 603,397. (No specimens.)

*To all whom it may concern:*

Be it known that I, ALEXANDER CLASSEN, professor and doctor of philosophy, a subject of the King of Prussia, Emperor of Germany, residing at Aix-la-Chapelle, in the Kingdom of Prussia, German Empire, have invented new and useful Improvements in the Manufacture of Compounds of Starch and other Bodies with Formic Aldehyde and the Like, of which the following is a specification.

Since about eight years it is known that formaldehyde, even the most dilute solutions thereof, possesses in a high degree the property of checking the development of bacteria or of killing them. This property, combined with only a slight poisonous effect, has rendered formaldehyde already a valuable preserving and antiseptic means, which is employed with great advantage. For treating wounds antiseptically, however, neither free formaldehyde nor the polymeric compound of acetic aldehyde, paraäldehyde, or trioxymethylene could be employed, because, as experience has taught, (Aronson, *Berliner Klinische Wochenschrift*, 1892, No. 29,) it has too great an irritating effect. In substances containing formaldehyde in chemical combination with other bodies and intended to be gradually dissociated (splitting off or freeing formaldehyde under the influence of the organic tissues and secretions) the body chemically bound to formaldehyde must not produce any prejudicial secondary effects. Now I have found that starch of any kind, such as starch containing flour, moreover starch-like substances, (dextrin, bassorin, carrageen, agar-agar, fermentive gum-galactan, inulin, lævulan, lichenin, and others, and the sea-weeds and lichens containing these bodies,) moreover gum species, (various kinds of gum-arabic, mucilage,) furthermore pectin substances, under certain conditions, combine with formaldehyde, forming chemical compounds, and that predetermined and permanent compounds are produced the physical and chemical properties of which differ entirely from the original substances. The manner of producing these new chemical compounds will appear from the following examples:

(1.) From 1.5 to two liters of a formaldehyde solution of forty per cent. are poured in a hermetically-closing vessel (digester) upon five kilograms of starch of any kind, (potato-starch, wheat-starch, maize-starch, rice-starch, arrow-root flour,) the mass being thoroughly mixed, and the hermetically-closed vessel is exposed for five or six hours to a temperature of from 100° to 120° centigrade. After cooling the mass containing still a large quantity of free formaldehyde is withdrawn from the vessel and heated again for twenty-four hours to a temperature of 120°, causing the formaldehyde to further act upon the starch. The mass obtained is then finely pulverized, mixed again with from 1.5 to two liters of formaldehyde, and the manipulation above described is repeated. In order to eliminate the free formaldehyle still present in the product finally obtained, the latter is treated with water or with some other solvent of formaldehyde, and finally it is dried at a temperature of from 100° to 110° centigrade.

(2.) Three kilograms of starch are thoroughly mixed with three liters of formaldehyde, so as to form a paste, and the paste is dried by drawing off the vapors *in vacuo*. Then it is heated for twenty-four hours to a temperature of 120° centigrade, causing the excess of formaldehyde present to act upon the starch. After disintegration the mass obtained is again mixed with formaldehyde, and the above-described manipulation is repeated. The elimination of free formaldehyde still present is carried out as under 1.

(3.) Three kilograms of starch are mixed with 0.5 kilogram of trioxymethylene. Since at ordinary temperature no reaction takes place between these two substances, nor even at temperatures of from 50° to 80° centigrade, it is necessary, in order to produce a chemical compound of formaldehyde with starch the properties of which agree with those of the compound described under 1 and 2, to heat the mass for twenty-four hours to a temperature of 120° centigrade and to repeat again with trioxymethylene the manipulation above described. The compound obtained is purified as indicated under 1.

(4.) Three kilograms of dextrine (arabin, inulin) are dissolved at a temperature of from 90° to 100° centigrade in 1.5 liters of formaldehyde (of forty per cent.,) the sirupy mass is heated for twenty-four hours to a temperature of from 120° to 130° centigrade, and after disintegration of the mass the above-described manipulation is repeated. The mass is purified as indicated under 1. In the case of arabin the reaction takes place easily, in that of dextrine less easily, and in the case of inulin only quite gradually.

(5.) One kilogram of a solution of twenty per cent. of carrageen mucilage, quince mucilage, agar-agar is evaporated to dryness on the water-bath together with two hundred cubic centimeters of formaldehyde. Then it is heated for twenty-four hours to a temperature of 120° centigrade and treated as indicated under 1.

(6.) One hundred parts of lichenin are mixed with one hundred parts of formaldehyde to a paste, heated for twenty-four hours to a temperature of 120° centigrade, and purified as indicated under 1.

I desire it to be understood that formaldehyde under similar conditions as above described forms compounds with starch or starch-like substances, pectin substances, vegetable gums, and the like, and that such substances therefore are equivalents for the purposes of my invention; also, the following substances are equivalents of formaldehyde in my process—viz., substances giving off formaldehyde or capable of splitting off formaldehyde or compounds having affinity to formaldehyde or to methyleneglycol.

The new compounds obtained according to my invention are chemical compounds, and I believe myself to be the first to produce a chemical combination of formaldehyde with starch or starch-like bodies. Such chemical compounds have not been obtained before my invention. Their behavior clearly shows that they are chemical compounds and not mere mixtures. Thus, first, they contain a predetermined quantity of formaldehyde in chemical combination; second, they are exceedingly permanent and will stand heating up to 180° centigrade without giving off any formaldehye; third, they combine chemically with iodin, as described in my German patent, No. 94,282, of May 7, 1896; fourth, they are capable of forming benzoyl compounds and acetyl compounds, as described in the German patent, No. 93,111, of July 31, 1896.

Characteristic features of the new compounds are, first, boiled with water they do not give off any formaldehyde; second, under the same circumstances the starch contained in the compounds does not form a paste; third, if heated with dilute acids or alkalies the compounds are decomposed, formaldehyde being given off; fourth, the same effect is obtained by the action of organic secretions and tissues, and upon this property is based the applicability of the new compounds in the treatment of wounds. The formaldehyde liberated gradually acts as an antiseptic, while the starch or the starch-like bodies are absorbed by the wound.

Some of the new compounds are soluble in water, others are not. This depends partly on the kind of starch used, since there are soluble and insoluble varieties of starch, and partly on the manner of treating the starch with formaldehyde. Exposed to the action of boiling water, acids, alkalies, organic tissues, and secretions the compounds soluble in water and those insoluble therein behave alike in the particulars hereinbefore mentioned. The soluble compounds are, however, particularly advantageous in many cases, since they can be used for injections and for preserving substances liable to putrefaction. They have proved very successful in treating gonorrhea and in preserving fruit.

Having thus described my invention, I claim as new and desire to secure by Letters Patent—

1. The herein-described process for the manufacture of compounds of starch and starch-like substances with formaldehyde, which consists in causing said substances to react with formaldehyde and heating the products of the reaction for about twenty-four hours to a temperature of about 120° centigrade, the compounds obtained by such heating being again treated with formaldehyde and then freed by means of a solvent of formaldehyde, such as water, from the excess of formaldehyde, and dried.

2. The herein-described process for the manufacture of chemical compounds of starch and starch-like substances with formaldehyde, which consists in placing said substances in the presence of each other under pressure and heating them to a temperature above 100° centigrade, thereby causing a chemcal reaction between the starch and the formaldehyde, whereupon the compound produced is dried and then freed from the excess of formaldehyde.

3. The herein-described compounds containing starch or starch-like substances in chemical combination with formaldehyde, said compounds presenting the following characteristics: when boiled with water, they do not give off any formaldehyde, nor does the starch or starch-like substance contained in them assume a pasty consistence; they may be heated up to 180° centigrade without giving off formaldehyde; when heated with dilute acids or alkalies, they are decomposed under liberation of formaldehyde; they are decomposed in a like manner by the action of organic tissues and secretions.

In testimony whereof I have signed my name to this specification in the presence of two subscribing witnesses.

ALEXANDER CLASSEN.

Witnesses:
JOHN HERKMANNS,
W. C. EMMET.